(12) United States Patent
Loeffler et al.

(10) Patent No.: US 8,505,413 B2
(45) Date of Patent: Aug. 13, 2013

(54) HYDRAULIC POWER OUTPUT UNIT AND HYDRAULIC HYBRID DRIVE SYSTEM INCLUDING SAME

(75) Inventors: John M. Loeffler, Olive Branch, MS (US); James H. Blalock, Olive Branch, MS (US)

(73) Assignee: Parker-Hannifin Corporation, Cleveland, OH (US)

( * ) Notice: Subject to any disclaimer, the term of this patent is extended or adjusted under 35 U.S.C. 154(b) by 850 days.

(21) Appl. No.: 12/348,089

(22) Filed: Jan. 2, 2009

(65) Prior Publication Data

US 2009/0260353 A1    Oct. 22, 2009

Related U.S. Application Data

(60) Provisional application No. 61/018,540, filed on Jan. 2, 2008.

(51) Int. Cl.
*F16H 47/00* (2006.01)

(52) U.S. Cl.
USPC .............................. 74/730.1; 74/574; 60/469

(58) Field of Classification Search
USPC .................. 74/730.1, 574; 60/469; 180/165, 180/381, 367; 475/72–83
See application file for complete search history.

(56) References Cited

U.S. PATENT DOCUMENTS

| | | | |
|---|---|---|---|
| 4,134,310 A * | 1/1979 | Orshansky et al. | 475/32 |
| 4,304,151 A * | 12/1981 | Meyerle et al. | 475/82 |
| 4,446,756 A * | 5/1984 | Hagin et al. | 475/75 |
| 4,485,691 A * | 12/1984 | Reed | 475/24 |
| 4,519,274 A * | 5/1985 | Maruyama et al. | 477/1 |
| 4,592,454 A * | 6/1986 | Michel | 192/3.23 |
| 4,941,371 A * | 7/1990 | Koyama et al. | 60/466 |
| 5,495,912 A | 3/1996 | Gray, Jr. et al. | |
| 5,607,027 A | 3/1997 | Puett, Jr. | |
| 5,691,588 A | 11/1997 | Lutz et al. | |
| 5,709,628 A * | 1/1998 | Pidde et al. | 475/75 |
| 5,803,856 A * | 9/1998 | Iino et al. | 475/72 |
| 5,890,982 A * | 4/1999 | Meyerle | 475/72 |
| 5,946,983 A * | 9/1999 | Brambilla | 74/730.1 |
| 5,971,092 A | 10/1999 | Walker | |
| 6,089,121 A | 7/2000 | Lohaus | |
| 6,119,802 A | 9/2000 | Puett, Jr. | |
| 6,668,953 B1 | 12/2003 | Reik et al. | |
| 6,719,080 B1 | 4/2004 | Gray, Jr. | |
| 6,875,113 B2 | 4/2005 | Nichols | |
| 7,059,442 B2 * | 6/2006 | Wilks et al. | 180/242 |

(Continued)

FOREIGN PATENT DOCUMENTS

EP         0428865 B1      5/1991

OTHER PUBLICATIONS

PCT Search Report for US09/030001.

*Primary Examiner* — Tisha Lewis
(74) *Attorney, Agent, or Firm* — MacMillan, Sobanski & Todd, LLC

(57) ABSTRACT

A hydraulic power output unit can be used in a hydraulic hybrid drive system for propelling a vehicle. The hydraulic power output unit includes a housing having an input shaft that extends within the housing and is adapted to be rotatably driven by a source of rotational power. A hydraulic pump is rotatably driven by the input driveshaft to pump hydraulic fluid. A vibration damper is provided within the housing for dampening vibrations in the input shaft.

3 Claims, 4 Drawing Sheets

(56) References Cited

U.S. PATENT DOCUMENTS

| | | |
|---|---|---|
| 7,082,757 B2 | 8/2006 | Teslak et al. |
| 7,093,679 B1 * | 8/2006 | Watson ......................... 175/170 |
| 7,100,723 B2 | 9/2006 | Roethler et al. |
| 7,147,078 B2 | 12/2006 | Teslak et al. |
| 7,147,239 B2 | 12/2006 | Teslak et al. |
| 7,232,192 B2 | 6/2007 | Teslak et al. |
| 7,273,122 B2 | 9/2007 | Rose |
| 7,806,796 B2 * | 10/2010 | Zhu ................................ 475/73 |
| 2005/0167177 A1 | 8/2005 | Roethler et al. |
| 2006/0000659 A1 | 1/2006 | Teslak et al. |
| 2006/0118346 A1 | 6/2006 | Rampen et al. |
| 2006/0174624 A1 | 8/2006 | Grabowski et al. |
| 2007/0278027 A1 | 12/2007 | Gray, Jr. et al. |

* cited by examiner

HYDRAULIC POWER OUTPUT UNIT AND HYDRAULIC HYBRID DRIVE SYSTEM INCLUDING SAME

CROSS-REFERENCE TO RELATED APPLICATIONS

This application claims the benefit of U.S. Provisional Application No. 61/018,540, filed Jan. 2, 2008, the disclosure of which is incorporated herein by reference.

BACKGROUND OF THE INVENTION

This invention relates in general to a hydraulic power output unit for generating hydraulic power on a vehicle. In particular, this invention relates to an improved structure for such a hydraulic power output unit and to the use of such an improved hydraulic power output unit in a hydraulic hybrid drive system for propelling a vehicle.

Drive train systems are widely used for generating power from a source and for transferring such power from the source to a driven mechanism. Frequently, the source generates rotational power, and such rotational power is transferred from the source of rotational power to a rotatably driven mechanism. For example, in most land vehicles in use today, an engine generates rotational power, and such rotational power is transferred from an output shaft of the engine through a driveshaft to an input shaft of an axle assembly so as to rotatably drive the wheels of the vehicle.

In some of these land vehicles and other mechanisms, a hybrid drive system (also known as an energy recovery system) is provided in conjunction with the drive train system to decelerate the rotatably driven mechanism, accumulate the energy resulting from such deceleration, and use the accumulated energy to subsequently accelerate the rotatably driven mechanism. To accomplish this, a typical hybrid drive system includes a reversible energy transfer machine that is coupled to the drive train system and an energy storage device that communicates with the reversible energy transfer machine. To decelerate the vehicle, the hybrid drive system is operated in a retarding mode, wherein the reversible energy transfer machine slows the rotation of the rotatably driven mechanism and stores the kinetic energy of the vehicle in the energy storage device as potential energy. To subsequently accelerate the vehicle, the hybrid drive system is operated in a driving mode, wherein the potential energy stored in the energy storage device is supplied to the reversible energy transfer machine to rotatably drive the rotatably driven mechanism. In a hydraulic type of hybrid drive system, pressurized fluid is used as the actuating mechanism. In such a hydraulic hybrid drive system, an accumulator functions as the energy storage device, and one or more hydraulic pump/motors function as reversible hydraulic machines.

It is known to provide certain vehicles with hydraulic power output units for providing hydraulic power to operate certain vehicle functions or accessories. One example of a hydraulic accessory that is driven by a hydraulic power output unit is a trash compacting cylinder on a refuse truck. The hydraulic power output unit is often embodied as a hydraulic pump that is selectively connectable to the vehicle transmission through a conventional power take-off.

When the vehicle is equipped with a hydraulic hybrid drive train system, a hydraulic power output unit provides hydraulic power to drive the driven wheels of the vehicle. There are generally two types of hydraulic hybrid drive train systems. In a parallel hybrid hydraulic drive train system, the vehicle includes both a conventional transmission as well as a hydraulic drive train system. A series hybrid hydraulic drive train system includes only the hydraulic drive train system, and the conventional transmission is removed from the vehicle. In both the parallel and series hybrid hydraulic drive train systems, the hydraulic power output unit forms a portion of the hydraulic drive train system for providing hydraulic power to a hydraulic motor for driving the driven wheels of the vehicle.

One problem encountered in vehicle drive train assemblies and other rotatable structures is that they tend to vibrate during operation. It is known that all mechanical bodies have a natural resonant frequency at which they tend to vibrate when operated at certain rotational speeds. This natural resonant frequency is an inherent characteristic of the mechanical body and is based upon many factors, including its composition, size, and shape. In the context of vehicular drive train assemblies, the engine and transmission assembly can sometimes generate vibrations that are transmitted to and accentuated by the driveshaft tube when rotated. Also, driveshaft tube may itself be rotated at a velocity that is at or near its natural resonant frequency (or one or more of the harmonics thereof), causing vibrations to be induced therein. In either event, the vibrations generated in the driveshaft tube are usually considered to be undesirable. Thus, it would be desirable to provide an improved structure for a hydraulic power output unit that minimizes this problem.

SUMMARY OF THE INVENTION

This invention relates to an improved structure for a hydraulic power output unit and to the use of such an improved hydraulic power output unit in a hydraulic hybrid drive system for propelling a vehicle. The hydraulic power output unit includes a housing having an input shaft that extends within the housing and is adapted to be rotatably driven by a source of rotational power. A hydraulic pump is rotatably driven by the input driveshaft to pump hydraulic fluid. A vibration damper is provided within the housing for dampening vibrations in the input shaft.

Various aspects of this invention will become apparent to those skilled in the art from the following detailed description of the preferred embodiments, when read in light of the accompanying drawings.

DETAILED DESCRIPTION OF THE PREFERRED EMBODIMENT

Figure 1:
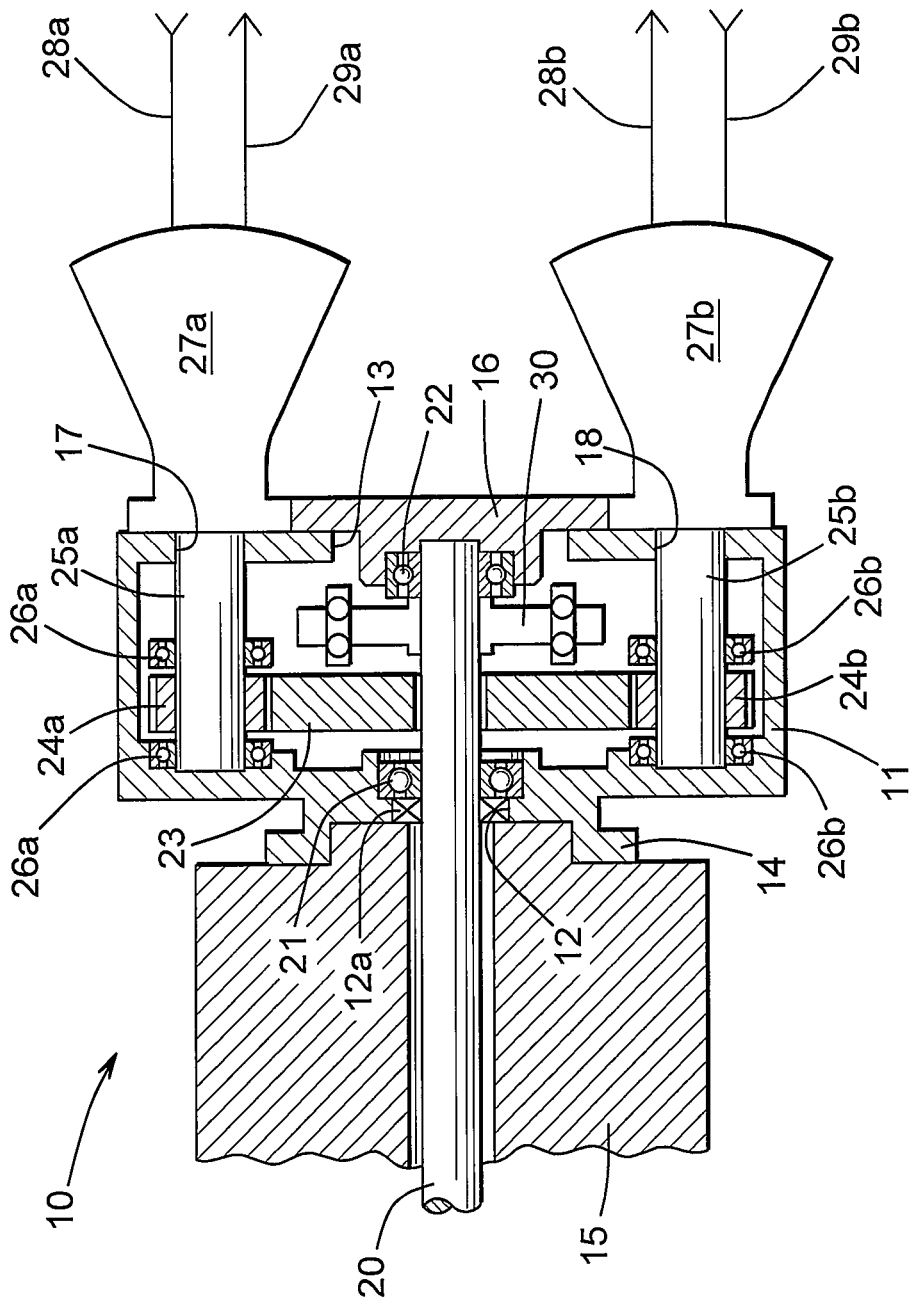
FIG. 1 is a schematic diagram of a hydraulic power output unit in accordance with this invention.

Referring now to the drawings, there is illustrated in FIG. 1 a hydraulic power output unit, indicated generally at 10, in accordance with this invention. The hydraulic power output unit 10 of this invention will be described and illustrated in the context of a drive train system for a vehicle, specifically a hydraulic hybrid drive system. However, such description and illustration are intended merely to illustrate one environment in which this invention may be used. Thus, the scope of this invention is not intended to be limited for use with the specific hydraulic hybrid drive systems or vehicular drive train systems in general.

The illustrated hydraulic power output unit 10 includes a housing 11 that is preferably formed from a durable and rigid material, such as a metallic material. The housing 11 of the hydraulic power output unit 10 may be formed from either a single piece of material or from a plurality of pieces of material that are connected together. The illustrated housing 11 has a first opening 12 formed through a first side thereof and a second opening 13 formed through a second side thereof that is opposite the first side. The purposes for these first and second openings 12 and 13 will be explained below. A conventional annular seal 12a is provided within the first opening 12 for a purpose that will also be explained below.

If desired, the first side of the housing 11 may also be provided with a flange portion, such as shown at 14. The flange portion 14 may be provided to facilitate the mounting of the housing 11 on a support structure 15. For example, the flange portion 14 may be used to facilitate the mounting of the housing 11 on a portion of a clutch housing 15 or other component of a conventional drive train system, such as a vehicular drive train system. The flange portion 14 may be shaped having a conventional SAE flange structure or any other known flange type or shape to facilitate such mounting. In the illustrated embodiment, the flange portion 14 extends about the first opening 14, although such is not required. Alternatively, the housing 11 of the hydraulic power output unit 10 may be mounted on the support structure 15 using any other desired means including, for example, through holes with associated fasteners, integral mounting studs, and the like. A cover 16 may be secured to the second side of the housing 11 to cover the second opening 13 and thereby prevent dirt, water, and other contaminants from entering into the interior of the hydraulic power output unit 10. Preferably, the cover 16 is selectively removable from the housing 11 for a purpose that will be explained below. Additionally, the illustrated housing 11 has third and fourth openings 17 and 18 formed through the second side thereof. The purposes for these third and fourth openings 17 and 18 will also be explained below.

An input shaft 20 extends through the first opening 14 formed through the first side of the housing 11 into the interior of the hydraulic power output unit 10. The input shaft 20 has an outer surface that is engaged by the seal 12a to prevent dirt, water, and other contaminants from entering into the interior of the hydraulic power output unit 10. The input shaft 20 is conventional in the art and may be rotatably driven by a conventional source of rotational power (not shown). For example, the input shaft 20 may be embodied as a conventional engine crankshaft or similar rotatably drive driveshaft. The illustrated input shaft 20 is rotatably supported on the housing 11 by a first bearing 21 that is supported on the first side of the housing 11 and a second bearing 22 that is supported on the cover 16 secured to the second side of the housing 11. The first and second bearings 21 and 22 may be embodied as conventional ball bearings, needle bearings, roller bearings, or any other desired structures. Also, a single bearing (not shown) with an overhung driveshaft may be used in place of the illustrated first and second bearings 21 and 22.

The hydraulic power output unit 10 also includes a drive gear 23 that is rotatably driven by the input shaft 20. In the illustrated embodiment, the drive gear 23 is connected to the input shaft 20 for rotation therewith. For example, the drive gear 23 may be splined to the input shaft 20 in a conventional manner. Thus, the drive gear 23 is rotated whenever the input shaft 20 is rotated. The hydraulic power output unit 10 also includes first and second driven gears 24a and 24b that are rotatably driven by the drive gear 23. In the illustrated embodiment, each of the first and second driven gears 24a and 24b meshes with the drive gear 23 for rotation therewith. Thus, the first and second driven gears 24a and 24b are rotated whenever the drive gear 23 is rotated.

The first and second driven gears 24a and 24b rotatably drive respective first and second driveshafts 25a and 25b. The first and second driveshafts 25a and 25b are rotatably supported on the housing 11 by respective pairs of bearings 26a and 26b. In the illustrated embodiment, the first and second driven gears 24a and 24b are respectively connected to the first and second driveshafts 25a and 25b for rotation therewith. For example, the first and second driven gears 24a and 24b may be respectively splined to the first and second driveshafts 25a and 25b in a conventional manner. Thus, the first and second driveshafts 25a and 25b are respectively rotated whenever the first and second driven gears 24a and 24b are rotated. The first and second driveshafts 25a and 25b extend respectively through the third and fourth openings 17 and 18 formed through the second side of the housing 11 into engagement with respective first and second hydraulic pumps 27a and 27b. In the illustrated embodiment, the first and second hydraulic pumps 27a and 27b are supported on the housing 11 of the hydraulic power output unit 10, although such is not required.

The first and second hydraulic pumps 27a and 27b may be embodied as any desired structures that are responsive to the rotation of the respective first and second driveshafts 25a and 25b for generating a flow of pressurized fluid. For example, the first and second hydraulic pumps 27a and 27b may be embodied as gear pumps, gerotor pumps, axial piston pumps, bent axis pumps, vane pumps, or the like. The first and second hydraulic pumps 27a and 27b include respective input lines 28a and 28b that communicate with a reservoir (not shown) or similar relatively low fluid pressure storage device. Similarly, the first and second hydraulic pumps 27a and 27b include respective output lines 29a and 29b that communicate with respective hydraulically actuated devices (not shown). If desired, the hydraulic power output unit 10 may be provided with only a single one of the first and second hydraulic pumps 27a and 27b. In such an instance, the opening 17 or 18 which is not provided with one of the first and second hydraulic pumps 27a and 27b may be closed by a separate cover (not shown) to prevent dirt, water, and other contaminants from entering into the interior of the hydraulic power output unit 10.

The hydraulic power output unit 10 further includes a vibration damper 30 that is adapted to dampen vibrations that may be generated in the input shaft 20 from the source of rotational power. To accomplish this, the vibration damper 30 is supported on the input shaft 20 for rotation therewith. For example, the vibration damper 30 may be splined to the input shaft 20 in a conventional manner. Thus, the vibration damper 30 is rotated whenever the input shaft 20 is rotated. The vibration damper 30 may be embodied as any known structure that is capable of dampening vibrations that may be present in the input shaft 20. For example, the vibration damper 30 may be embodied as a conventional torsional damper assembly that includes a first portion that is secured to the input shaft 20 for rotation therewith, a second portion that is supported on the first portion for rotational movement relative thereto, and a dampening structure that reacts between the first portion and the second portion. Typically, the dampening structure is embodied as one or more springs that extend between the first portion and the second portion of the vibration damper 30. When vibrations are present in the input shaft 20, the first and second portions of the vibration damper 30 rotate slightly relative to one another. The dampening structure absorbs some of the energy from such relatively rotational movements, thereby dampening the magnitude of the vibrations that would otherwise be transferred from the source of rotational power and through the input shaft 20 to the drive gear 23, the first and second driven gears 24a and 24b, the first and second driveshafts 25a and 25b, and the first and second hydraulic pumps 27a and 27b. As a result, the amount of undesirable vibrations that are transmitted through the hydraulic power output unit 10 to the first and second hydraulic pumps 27a and 27b is minimized.

As discussed above, the cover 16 is secured to the second side of the housing 11 to cover the second opening 13 and thereby prevent dirt, water, and other contaminants from entering into the interior of the hydraulic power output unit 10. Preferably, the cover 16 is selectively removable from the housing 11 to facilitate access to the vibration damper 30 when needed. Such access may be desirable to adjust the operation of the vibration damper 30, such as by adding, subtracting, or otherwise changing the springs or other dampening structure. In this manner, the operation of the vibration damper 30 can be customized to the specific application or environment for the hydraulic power output unit 10. Also, such access may be desirable to perform maintenance or repairs on the various components of the vibration damper 30.

Figure 2:
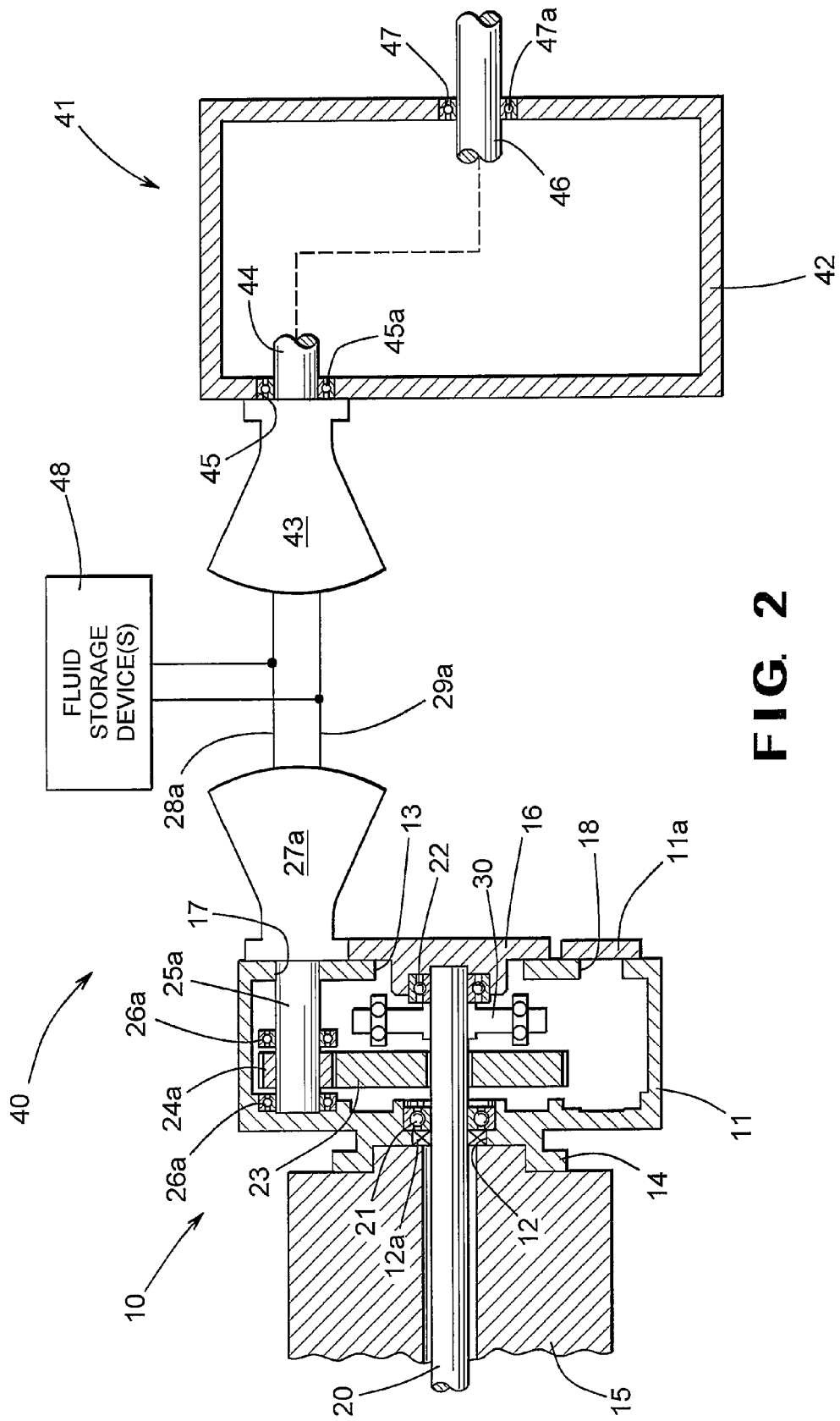
FIG. 2 is a schematic diagram of the hydraulic power output unit illustrated in FIG. 1 used together with a first embodiment of a hydraulic hybrid drive system.

FIG. 2 is a schematic diagram of the hydraulic power output unit 10 illustrated in FIG. 1 used together with a first embodiment of a hydraulic hybrid drive system, indicated generally at 40. The structure and manner of operation of the hydraulic power output unit 10 is substantially the same as described above with regard to FIG. 1, with the exception that in the embodiment illustrated in FIG. 2, the hydraulic power output unit 10 includes only a single one of the driven gears 24a, driveshafts 25a, bearing pairs 26a, and hydraulic pumps 27a. As described above, a cover 11a covers the fourth opening 18 formed through in the second side of the housing 11.

The hydraulic hybrid drive train 40 also includes a drive unit, indicated generally at 41. The drive unit 41 is spaced apart from the hydraulic power output unit 10 and is preferably located between a pair of opposed side rails of the frame of the vehicle. The drive unit 41 is generally conventional in the art and includes a housing 42 having opposed first and second sides. The drive unit 41 includes a hydraulic motor 43 that communicates through the lines 28a and 29a with the first hydraulic pump 27a of the hydraulic power output unit 10. By locating the hydraulic motor 43 on the first side of the housing 42 that is located nearest to the first hydraulic pump 27a of the hydraulic power output unit 10, the amount of fluid piping between the first hydraulic pump 27a and the hydraulic motor 43 can be minimized. In the illustrated embodiment, the hydraulic motor 43 is directly supported on the housing of the drive unit 42, although such is not required. The purpose for and manner of operation of the hydraulic motor 43 will be explained below.

The hydraulic motor 43 is adapted to rotatably drive a shaft 44 that extends through a first opening 45 formed through the first side of the drive unit 41 and, therefore, functions as an input shaft to the drive unit 41. The input shaft 44 of the drive unit 41 may be supported for rotation relative to the housing 42 by one or more bearings, such as shown at 45a within the first opening 45. The input shaft 44 of the drive unit 41 transfers rotational power to an output shaft 46 by any known means, as indicated by the dotted lines in FIG. 2. For example, rotational power can be transferred from the input shaft 44 of the drive unit 41 to the output shaft 46 either directly or by a plurality of gears (now shown) disposed within the housing 42 of the drive unit 41. The plurality of gears can provide either a single gear ratio or a plurality of user-selectable gear ratios between the input shaft 44 of the drive unit 41 and the output shaft 46. The output shaft 46 extends through a second opening 47 formed through the second side of the drive unit 41. The output shaft 46 may be supported for rotation relative to the housing 42 by one or more bearings, such as shown at 47a within the second opening 47. The output shaft 46 of the drive unit 41 may be co-axially aligned with the input shaft 20 of the hydraulic power output unit 10, although such is not required. The output shaft 46 is connected to rotatably drive one or more wheels (not shown) of a vehicle or other rotatably driven device.

The hydraulic hybrid drive train 40 may also include one or more conventional fluid storage devices 48. The fluid storage devices 48 are conventional in the art and may, for example, include either or both of a low pressure reservoir and a high pressure accumulator. FIG. 2 schematically illustrates the fluid storage devices 48 in a location between the hydraulic power output unit 10 and the drive unit 40.

During operation of the hydraulic hybrid drive train 40, low pressure hydraulic fluid is provided to the first hydraulic pump 27a of the hydraulic power output unit 10. The first hydraulic pump 27a supplies high pressure hydraulic fluid to the hydraulic motor 43 of the drive unit 40. As a result, the hydraulic motor 43 causes the input shaft 44 of the drive unit 41 to rotate, which, in turn, causes rotation of the output shaft 46 to drive the wheels of the vehicle. Alternatively, the first hydraulic pump 27a may pump hydraulic fluid into the high pressure accumulator of the fluid storage device 48, and fluid from that high pressure accumulator can be subsequently used to drive the hydraulic motor 43.

If the fluid storage device 48 includes a high pressure accumulator, the hybrid hydraulic drive train 40 may be adapted to recover and store energy during certain events, such as vehicle braking. In this situation, the drive unit 41 is either adapted to include a hydraulic pumping unit (not shown) or the hydraulic motor 43 can be embodied as a conventional hydraulic pump/motor assembly. In this instance, when a braking event occurs, fluid is pumped from hydraulic pump/motor assembly to the high pressure accumulator of the fluid storage device 48. At a later time, the pressurized fluid stored in the high pressure accumulator is supplied to the drive the hydraulic pump/motor assembly and, in turn, rotate the output shaft 118 and driven wheels of the vehicle.

Figure 3:
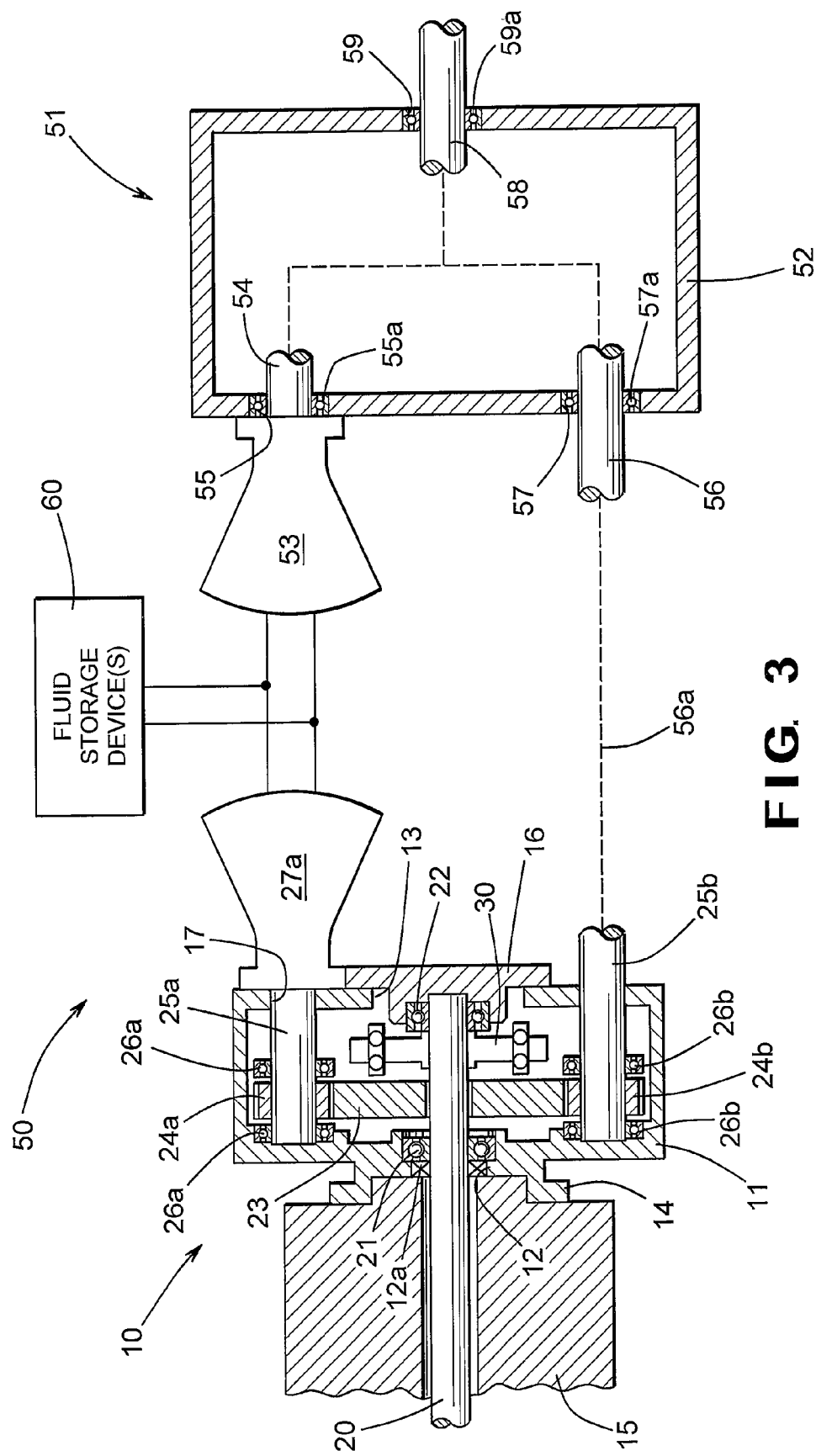
FIG. 3 is a schematic diagram of the hydraulic power output unit illustrated in FIG. 1 used together with a second embodiment of a hydraulic hybrid drive system

FIG. 3 is a schematic diagram of the hydraulic power output unit 10 illustrated in FIG. 1 used together with a second embodiment of a hydraulic hybrid drive system, indicated generally at 50. The structure and manner of operation of the hydraulic power output unit 10 is substantially the same as described above with regard to FIG. 1.

The hydraulic hybrid drive train 50 also includes a drive unit, indicated generally at 51. The drive unit 51 is spaced apart from the hydraulic power output unit 10 and is preferably located between a pair of opposed side rails of the frame of the vehicle. The drive unit 51 is generally conventional in the art and includes a housing 52 having opposed first and second sides. The drive unit 51 includes a hydraulic motor 53 that communicates through the lines 28a and 29a with the first hydraulic pump 27a of the hydraulic power output unit 10. By locating the hydraulic motor 53 on the first side of the housing 52 that is located nearest to the first hydraulic pump 27a of the hydraulic power output unit 10, the amount of fluid piping between the first hydraulic pump 27a and the hydraulic motor 53 can be minimized. In the illustrated embodiment, the hydraulic motor 53 is directly supported on the housing of the drive unit 52, although such is not required. The purpose for and manner of operation of the hydraulic motor 53 will be explained below. The hydraulic motor 53 is adapted to rotatably drive a first input shaft 54 to the drive unit 51. The first input shaft 54 to the drive unit 51 extends through a first opening 55 formed through the first side of the drive unit 51. The first input shaft 54 to the drive unit 51 may be supported for rotation relative to the housing 52 by one or more bearings, such as shown at 55a within the first opening 55.

In the embodiment illustrated in FIG. 3, the second driveshaft 25b of the hydraulic power output unit 10 is not connected to rotatably drive the second hydraulic pump 27b. Rather, the second driveshaft 25b of the hydraulic power output unit 10 is connected to rotatably drive a second input shaft 56 to the drive unit 51. The second driveshaft 25b of the hydraulic power output unit 10 may be connected to rotatably drive the second input shaft 56 to the drive unit 51 by any conventional means such as, for example, a conventional driveshaft (indicated schematically at 56a) extending therebetween. Preferably, a clutch (not shown) is provided such that the second driveshaft 25b of the hydraulic power output unit 10 is selectively engaged to rotatably drive the second input shaft 56 to the drive unit 51. Such a clutch may, for example, be provided as part of the hydraulic power output unit 10. The second input shaft 56 to the drive unit 51 extends through a second opening 57 formed through the first side of the drive unit 51. The second input shaft 56 to the drive unit 51 may be supported for rotation relative to the housing 52 by one or more bearings, such as shown at 57a within the first opening 57.

The first input shaft 54 and the second input shaft 56 transfer rotational power to an output shaft 58 by any known means, as indicated by the dotted lines in FIG. 2. For example, a conventional clutching mechanism (not shown) may be provided within the housing 52 of the drive unit 51 such that either the first input shaft 54 or the second input shaft 56 is connected to transfer rotational power to the output shaft 58. Rotational power can be transferred from the selected one of the first input shaft 54 and the second input shaft 56 to the output shaft 58 either directly or by a plurality of gears (now shown) disposed within the housing 52 of the drive unit 51. The plurality of gears can provide either a single gear ratio or a plurality of user-selectable gear ratios between the first input shaft 54 and the second input shaft 56 and the output shaft 58. The output shaft 58 extends through a second opening 59 formed through the second side of the drive unit 51. The output shaft 58 may be supported for rotation relative to the housing 52 by one or more bearings, such as shown at 59a within the second opening 59. The output shaft 58 of the drive unit 51 may be co-axially aligned with the input shaft 20 of the hydraulic power output unit 10, although such is not required. The output shaft 58 is connected to rotatably drive one or more wheels (not shown) of a vehicle or other rotatably driven device.

The hydraulic hybrid drive train 50 may also include one or more conventional fluid storage devices 60. The fluid storage devices 60 are conventional in the art and may, for example, include either or both of a low pressure reservoir and a high pressure accumulator. FIG. 3 schematically illustrates the fluid storage devices 60 in a location between the hydraulic power output unit 10 and the drive unit 50.

Figure 4:
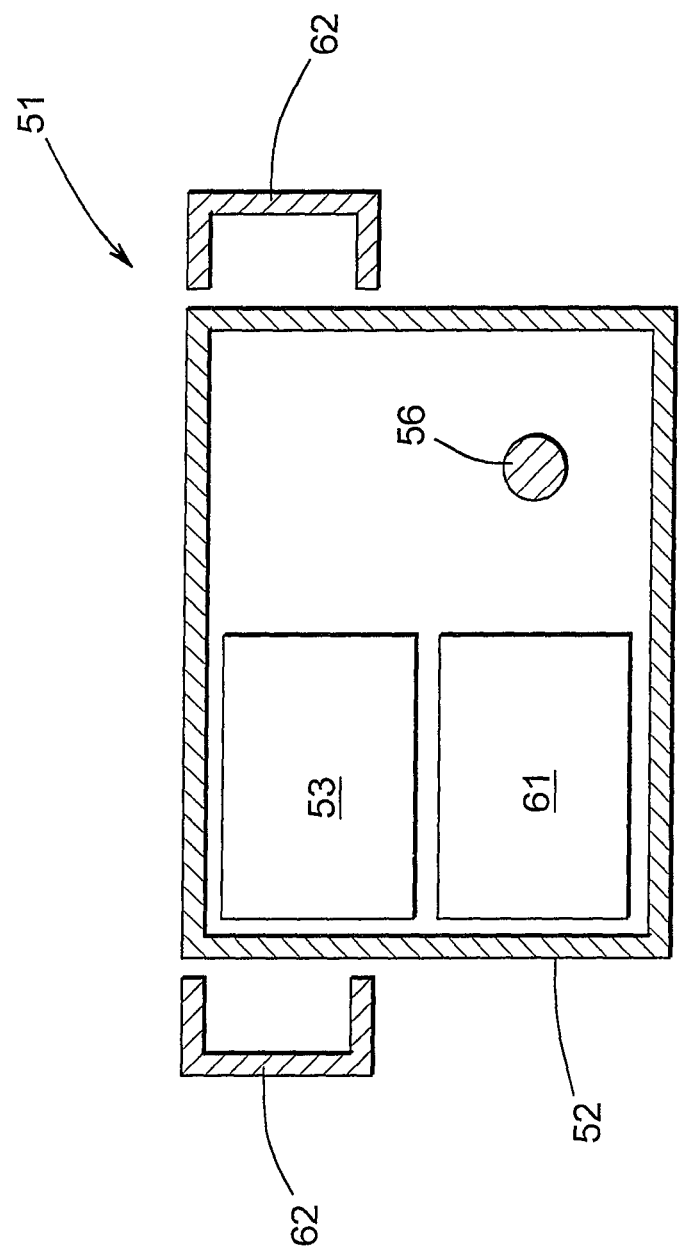
FIG. 4 is a schematic end elevational view of the drive unit illustrated in FIG. 3.

FIG. 4 is a schematic end elevational view of the first side of the drive unit 51 illustrated in FIG. 3. The drive unit 51 may further include an optional pump/motor 61 in addition to the hydraulic motor 53. The pump/motor 61 may function as either a pump, a motor, or both a pump and a motor for providing fluid to the fluid storage devices 60 or using fluid from either the first hydraulic pump 27a or the fluid storage devices 60. As also shown in FIG. 4, the driveshaft 56a that extends between the second driveshaft 25b of the hydraulic power output unit 10 and the second input shaft 56 to the drive unit 51 can be offset relative to rotational axes of the input shaft 20 driveshaft 22. This offsetting of the driveshaft 56a enables the drive unit 51 to be more compact, while still having both a mechanical connection to the second driveshaft 25b of the hydraulic power output unit 10 and at least one hydraulic motor 53. As FIG. 4 illustrates, this compactness of the drive unit 102 enables the drive unit to be located between the opposed side rails 62 of the frame of the vehicle. The embodiment illustrated in FIGS. 3 and 4 may operate in a manner that is similar to that of FIG. 2, with the addition of providing a direct drive mode for driving the wheels of the vehicle through input shaft 20, the second driveshaft 25b, the driveshaft 56a, and the output shaft 58.

The principle and mode of operation of this invention have been explained and illustrated in its preferred embodiments. However, it must be understood that this invention may be practiced otherwise than as specifically explained and illustrated without departing from its spirit or scope.

What is claimed is:
1. A hydraulic power output unit comprising:
a housing;
an input shaft that extends within the housing and is adapted to be rotatably driven by a source of rotational power;
a drive gear that is supported on the input shaft for rotation therewith;
a first driven gear that is rotatably driven by the drive gear and is supported on a first driveshaft so as to rotatably drive a first hydraulic pump to pump hydraulic fluid;
a second driven gear that is rotatably driven by the drive gear and is supported on a second driveshaft so as to rotatably drive a second hydraulic pump to pump hydraulic fluid; and
a vibration damper provided within the housing for dampening vibrations in the input shaft.

2. The hydraulic power output unit defined in claim 1 wherein the vibration damper is supported on the input shaft for rotation therewith.

3. The hydraulic power output unit defined in claim 2 wherein the vibration damper is splined onto the input shaft.

\* \* \* \* \*